Patented May 11, 1948

2,441,225

UNITED STATES PATENT OFFICE 2,441,225

PREPARATION OF A STABILIZED TITANIUM DIOXIDE PIGMENT

Alphonse Pechukas, Akron, Ohio, assignor to Pittsburgh Plate Glass Company, Pittsburgh, Pa., a corporation of Pennsylvania No Drawing. Application January 18, 1944, Serial No. 518,742

5 Claims. (Cl. 106—300)

The present invention relates to the preparation of composite pigmentary materials and more particularly to a process of manufacturing a stabalized titanium dioxide pigment.

One object of my invention is to produce a pigmentary titanium dioxide which is particularly resistant to discoloration and excessive chalking when embodied in coating compositions, especially those employing resinous vehicles of the alkyd type.

Another object of the invention is the provision of a simplified process of manufacturing a composite aluminum oxide-titanium dioxide pigment.

Other objects and advantages of the present invention will become readily apparent from the following detailed description of certain embodiments thereof.

There have previously been suggested numerous methods of increasing the resistance of pigmentary titanium dioxide to chemical and physical deterioration wherein the material is treated with various compounds of aluminum as well as of other metals, such as antimony, bismuth, cadmium, calcium, lead, and zinc. A majority of these prior processes are based upon the so-called "wet method." In other words, soluble salts of the treating metals are added to an aqueous suspension of the finely divided titanium dioxide and insoluble compounds of the treating metals are precipitated upon the particles of titanium dioxide by suitable means. Thereafter, the composite material is recovered and dried. It will, at once, be obvious that handling of aqueous solutions and subsequent drying operations entail increased manufacturing costs. Where the titanium dioxide is initially obtained in dry form, as by the reaction of titanium tetrachloride with oxygen or air, formation of an aqueous suspension thereof, to facilitate its combination with a stabilizing metal represents an uneconomical procedure, the elimination of which is most desirable.

Briefly stated, the present invention contemplates the exposure of finely divided titanium dioxide to aluminum chloride vapors at a temperature in excess of 300° C.

A convenient method of preparing the composite pigment of the present invention consists in introducing vapors of anhydrous aluminum chloride into a suitably heated muffle or similar furnace containing finely divided titanium dioxide such, for example, as that produced by the thermal decomposition of titanium tetrachloride. The vapors of aluminum chloride are thus brought into contact with the particles of titanium dioxide present in the furnace and react therewith to form a composite aluminum oxide-titanium dioxide pigment. This reaction probably proceeds according to the equation:

$$3TiO_2 + 4AlCl_3 \rightleftharpoons 3TiCl_4 + 2Al_2O_3$$

until each particle of titanium dioxide is coated with a thin film of aluminum oxide. Although this film is considered to be uniform, there is undoubtedly a decrease in the aluminum oxide content in the base portion of the film, wherein a mixture of $TiO_2$ and $Al_2O_3$ exists. Despite the fact that the alumina coating is very thin, it is effective in establishing a satisfactory color stability in the pigment.

To supplement the general description of my invention, the following specific examples are given by way of illustration only:

Vaporized anhydrous aluminum chloride was introduced into an externally heated muffle furnace containing a thin layer of finely divided titanium dioxide. The temperature of the furnace was maintained above 300° C. to promote reaction between the aluminum chloride and titanium dioxide. No special provision was necessary to insure contact between the reagents for the vapors of aluminum chloride permeated readily the layer of $TiO_2$ and the reaction, involving only the surfaces of the $TiO_2$ particles, proceeded without difficulty. The composite pigment was removed from the furnace and calcined at 800° C. until substantial neutrality was reached. To ascertain the effects of this treatment, samples of the pigment were incorporated in an air-drying enamel vehicle of the alkyd type and exposed for a period of 400 hours to ultra-violet light.

The experimental results are best presented in the following table:

Table I

| Run | Temp. of Treatment | Relative Wt. of AlCl₃ Used | pH of Pigment Calcined After Treatment | Results on Exposure |
|---|---|---|---|---|
| | | Per cent | | |
| 1 | 300° C | 4.5 | 6.8 | Bleached. |
| 2 | 400° C | 2.5 | 7.0 | No change. |
| 3 | 500° C | 1.5 | 7.0 | Do. |
| 4 | 600° C | 1.0 | 6.2 | Darkened. |
| 5 | 600° C | 11.0 | 7.0 | Do. |
| Untreated | TiO₂ | | | Do. |

The experiments were repeated using titanium dioxide which was calcined both before and after treatment with aluminum chloride. The resulting pigment was incorporated in enamel and tested under conditions identical to those hereinbefore described.

Table II summarizes these experiments:

*Table II*

| Run | Temp. of Treatment | Relative Wt. of AlCl₃ Used | pH of Treated Pigment After Calcination | Results on Exposure |
|---|---|---|---|---|
| | | Per cent | | |
| 6 | 300° C | 1.5 | 6.6 | Bleached. |
| 7 | 400° C | 0.5 | 6.6 | Do. |
| 8 | 500° C | 1.5 | 7.0 | Do. |
| 9 | 600° C | 1.0 | 7.0 | Do. |
| Untreated | Calcined TiO₂ | | | Darkened. |

The foregoing results exhibit clearly the stabilizing effect of aluminum chloride treatment on titanium dioxide pigment. Enamels containing the treated titanium dioxide did not darken upon exposure, whereas enamels containing untreated titanium dioxide did darken.

The experiments were again repeated using varying amounts of aluminum chloride to treat calcined titanium dioxide at a constant temperature. The results of these runs are given in Table III.

*Table III*

| Run | Temp. of Treatment | Relative Wt. of AlCl₃ Used | Minimum Calcination Temp. to reach pH of 6.8–7.0 | Results of Exposure |
|---|---|---|---|---|
| | ° C. | Per cent | ° C. | |
| 10 | 600 | 0.1 | 900 | No change. |
| 11 | 600 | 0.2 | 900 | Do. |
| 12 | 600 | 0.5 | 900 | Bleached. |
| 13 | 600 | 1.0 | 900 | No change. |
| 14 | 600 | 1.1 | 900 | Bleached. |
| 15 | 600 | 2.0 | 800 | Do. |
| 16 | 600 | 2.3 | 600 | Do. |
| 17 | 600 | 3.2 | 600 | Do. |
| 18 | 600 | 4.0 | 600 | Do. |
| 19 | 600 | 4.5 | 500 | Do. |

It will be observed from the results listed in Table III that pigmentary titanium dioxide is stabilized against discoloration by treatment with as little as 0.1% by weight of aluminum chloride. Some improvement in color was noted in runs 12 and 14. It should be pointed out, however, that at least 2% and preferably in excess of 4% of aluminum chloride, based upon the weight of titanium dioxide treated, should be employed in order that the temperature required for calcination of the treated pigment to a pH of from 6.8 to 7.0 may be reduced.

I have also discovered that calcination after the treatment with aluminum chloride is necessary in order to impart the greatest degree of stability to the composite pigment. Treated pigments which were not calcined to substantial neutrality exhibited a tendency to darken upon exposure although their original color was considerably improved.

The treatment of titanium dioxide with aluminum chloride as contemplated by my invention may also be preformed in conjunction with the preparation of the titanium dioxide. In the reaction of titanium tetrachloride with oxygen or air, forming pigmentary titanium dioxide as shown in U. S. Patent 2,333,948, issued November 9, 1943, the reaction products are usually led into a filter chamber wherein the titanium dioxide is collected upon a plurality of filter bags or tubes. The filter chamber is maintained at a temperature in excess of 300° C., and after layers of titanium dioxide are built up on the filter media, anhydrous aluminum chloride is introduced into the chamber wherein it is vaporized. The vapors of aluminum chloride pass through the layers of titanium dioxide and react therewith as hereinbefore described. A small amount of the aluminum chloride vapors passes through the filters before reacting with the titanium dioxide collected thereon and to offset this loss, an excess of aluminum chloride is preferably vaporized within the filter chamber. Samples of the composite pigment prepared in this manner were found to be stabilized against discoloration upon exposure and had a marked color improvement.

While my invention has been described as having particular application to titanium dioxide, the treatment of other titanium pigments, as for example, titanium dioxide admixed or extended with barium sulfate, calcium carbonate, silica and the like, is contemplated. Accordingly, the term "titanium dioxide pigment" as employed in the specification and claims includes not only titanium dioxide itself but mixed pigments having a titanium dioxide base.

It will be readily apparent that various modifications in the specific details of my invention may be made without departing from the spirit thereof or the scope of the appended claims.

What I claim is:

1. A process of preparing a composite pigmentary material which comprises heating finely divided titanium dioxide in the presence of vaporized aluminum chloride at a temperature of about 600° C.

2. A process of preparing a stabilized titanium dioxide pigment which comprises heating finely divided titanium dioxide in the presence of from 2–5% by weight of vaporized anhydrous aluminum chloride at a temperature of about 600° C.

3. A process of preparing a stabilized titanium dioxide pigment which comprises heating finely divided titanium dioxide in the presence of vaporized aluminum chloride at a temperature in excess of 300° C. and calcining the product to substantial neutrality.

4. A process of preparing a stabilized titanium dioxide pigment which comprises heating finely divided titanium dioxide in the presence of from 2–5% by weight of vaporized anhydrous aluminum chloride at a temperature in excess of 300° C. and calcining the product to a pH of from 6.8 to 7.

5. A process of preparing a stabilized titanium dioxide pigment which comprises heating finely divided titanium dioxide in the presence of from 2–5% by weight of vaporized anhydrous aluminum chloride at a temperature of about 600° C. and calcining the product to a pH of from 6.8 to 7.

ALPHONSE PECHUKAS.

REFERENCES CITED

The following references are of record in the file of this patent:

UNITED STATES PATENTS

| Number | Name | Date |
|---|---|---|
| 2,304,719 | Weber et al. | Dec. 8, 1942 |

OTHER REFERENCES

Handbook of Chemistry, by Lange, 1934, pages 110–111.